(12) United States Patent
Latta et al.

(10) Patent No.: US 9,179,021 B2
(45) Date of Patent: Nov. 3, 2015

(54) PROXIMITY AND CONNECTION BASED PHOTO SHARING

(75) Inventors: Stephen G. Latta, Seattle, WA (US); Kenneth P. Hinckley, Redmond, WA (US); Kevin Geisner, Mercer Island, WA (US); Steven Nabil Bathiche, Kirkland, WA (US); Hrvoje Benko, Seattle, WA (US); Vivek Pradeep, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/455,797

(22) Filed: Apr. 25, 2012

(65) Prior Publication Data

US 2013/0286223 A1    Oct. 31, 2013

(51) Int. Cl.
   *H04N 1/00* (2006.01)
   *H04N 1/44* (2006.01)

(52) U.S. Cl.
   CPC ....... *H04N 1/00347* (2013.01); *H04N 1/00137* (2013.01); *H04N 1/00151* (2013.01); *H04N 1/444* (2013.01); *H04N 2201/0036* (2013.01); *H04N 2201/0041* (2013.01)

(58) Field of Classification Search
   USPC ...................................... 348/207.1; 725/105
   See application file for complete search history.

(56) References Cited

U.S. PATENT DOCUMENTS

| 7,809,192 | B2 | 10/2010 | Gokturk et al. | |
| 8,204,437 | B1 * | 6/2012 | Rothschild | 455/41.2 |
| 2006/0171695 | A1 | 8/2006 | Jung et al. | |
| 2007/0255807 | A1 | 11/2007 | Hayashi et al. | |
| 2008/0106621 | A1 * | 5/2008 | Jung et al. | 348/262 |
| 2009/0254614 | A1 | 10/2009 | Brush et al. | |
| 2010/0293198 | A1 | 11/2010 | Marinucci et al. | |
| 2012/0011197 | A1 * | 1/2012 | Arisawa et al. | 709/203 |
| 2012/0093355 | A1 * | 4/2012 | Levien et al. | 382/100 |
| 2012/0140083 | A1 * | 6/2012 | Schultz et al. | 348/207.1 |
| 2013/0194438 | A1 * | 8/2013 | Sweet et al. | 348/207.1 |

OTHER PUBLICATIONS

Vazquez-Fernandez, et al., "Built-in face recognition for smart photo sharing in mobile devices", Retrieved at <<http://ieeexplore.ieee.org/stamp/stamp.jsp?tp=&arnumber=6012057>>, IEEE International Conference on Multimedia and Expo (ICME), Jul. 11-15, 2011, pp. 1-4.

"iPhoto'11", Retrieved at <<http://www.apple.com/ilife/iphoto/what-is.html>>, Retrieved Date: Oct. 27, 2011, pp. 6.

Davis, et al., "MMM2: Mobile Media Metadata for Media Sharing", Retrieved at <<http://citeseer.ist.psu.edu/viewdoc/download;jsessionid=7C432C20D851B1D05019C905D2580D65?doi=10.1.1.83.3035&rep=rep1&type=pdf>>, Extended Abstracts of the Conference on Human Factors in Computing Systems, 2005, pp. 1335-1338.

"Share pictures and videos", Retrieved at <<http://www.microsoft.com/windowsphone/en-us/howto/wp7/pictures/upload-pictures-to-the-web.aspx>>, Retrieved Date: Oct. 27, 2011, pp. 3.

"International Search Report", Mailed Date: Jun. 20, 2013, Application No. PCT/US2013/037042, Filed Date: Apr. 18, 2013, pp. 8.

* cited by examiner

*Primary Examiner* — Twyler Haskins
*Assistant Examiner* — Angel L Garces-Rivera
(74) *Attorney, Agent, or Firm* — Micah Goldsmith; Judy Yee; Micky Minhas

(57) ABSTRACT

Photos are shared among devices that are in close proximity to one another and for which there is a connection among the devices. The photos can be shared automatically, or alternatively based on various user inputs. Various different controls can also be placed on sharing photos to restrict the other devices with which photos can be shared, the manner in which photos can be shared, and/or how the photos are shared.

26 Claims, 5 Drawing Sheets

PROXIMITY AND CONNECTION BASED PHOTO SHARING

BACKGROUND

Digital cameras today can be found in numerous different types of devices, including dedicated digital cameras, cell phones, computers, game consoles, and so forth. This widespread availability of digital cameras allows users to take large numbers of digital photos, but problems still remain. One such problem is that it can be difficult for users to share the digital photos they take with other users. Sharing digital photos is oftentimes a complex process involving numerous steps, which can be time-consuming and frustrating for users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a photo captured at a device is received. A determination of one or more other devices in close proximity to the device is made. A determination of a connection between the device and at least one of the one or more other devices is also made, and the photo is automatically shared with at least one of the one or more other devices.

In accordance with one or more aspects, in a setting with multiple devices capable of showing photos, a connection between a photo taking device and one or more other devices is determined. Properties, permissions, and/or securities of the one or more other devices are also determined. A photo taken by the photo taking device is received, and the photo is shared with the one or more other devices based on at least one of the properties, permissions, and/or securities. The photo is displayed on at least some of the other devices, and an opportunity is provided for rejection of the photo on at least some of the other devices prior to sharing the photo with the one or more other devices.

BRIEF DESCRIPTION OF THE DRAWINGS

The same numbers are used throughout the drawings to reference like features.

DETAILED DESCRIPTION

Proximity and connection based photo sharing is discussed herein. Photos are shared among devices that are in close proximity to one another and for which there is a connection among the devices. Devices being in close proximity to one another refers to, for example, devices being at the same location and/or within a threshold distance of one another. There being a connection among devices refers to, for example, the user of one of the devices being included in a social network of the users of the other devices. The photos can be shared automatically, or alternatively based on various user inputs. Various different controls can also be placed on sharing photos to restrict the other devices with which photos can be shared, the manner in which photos can be shared, and/or how the photos are shared.

Figure 1:
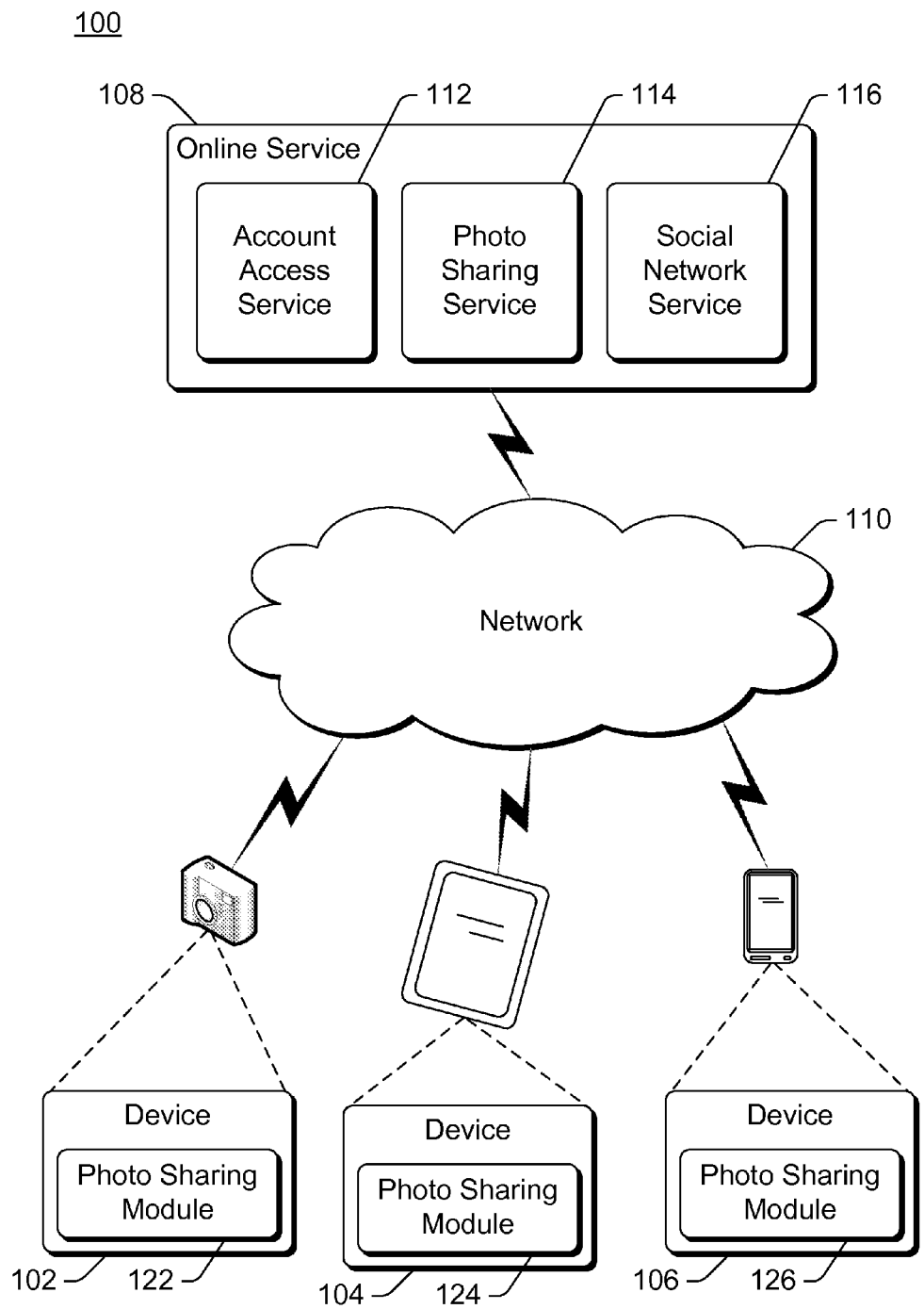
FIG. 1 illustrates an example system implementing the proximity and connection based photo sharing in accordance with one or more embodiments.

FIG. 1 illustrates an example system 100 implementing the proximity and connection based photo sharing in accordance with one or more embodiments. System 100 includes a device 102, a device 104, a device 106, and an online service 108 that can communicate with one another via a network 110. Network 110 can be a variety of different networks, including the Internet, a local area network (LAN), a public telephone network, an intranet, other public and/or proprietary networks, combinations thereof, and so forth. Although three devices 102-106 and service 108 are illustrated, system 100 can include any number of devices and any number of services.

Device 102 is illustrated as a dedicated digital camera, device 104 is illustrated as a tablet computer, and device 106 is illustrated as a cellular phone. However, it should be noted that each device 102, 104, and 106 can be a variety of different types of devices. For example, each device 102-106 can be a desktop computer, a server computer, a laptop or netbook computer, a tablet or notepad computer, a mobile station, an entertainment appliance, a set-top box communicatively coupled to a display device, a television or other display device, a cellular or other wireless phone, a digital camera or camcorder, a game console, an automotive computer, and so forth. Thus, devices 102-106 may range from full resource devices with substantial memory and processor resources (e.g., personal computers, game consoles) to low-resource devices with limited memory and/or processing resources (e.g., traditional set-top boxes, hand-held game consoles). Devices 102-106 can be different types of devices and/or the same types of devices.

Online service 108 facilitates communication of various data and information, including photos, among devices 102-106. Online service 108 includes an account access service 112, a photo sharing service 114, and a social network service 116, each of which can communicate with one another. Services 112, 114, and 116 can communicate with one another within online service 108 and/or via devices 102-106. Online service 108 can also optionally include various additional functionality, including messaging functionality, gaming functionality, and so forth.

Account access service 112 provides various functionality supporting user accounts of online service 108. Different users and/or devices 102-106 typically have different accounts with online service 108, and can log into their accounts via account access service 112. A user or device 102-106 logs into an account providing credential information, such as an id (e.g., user name, email address, etc.) and password, a digital certificate or other data from a smartcard, and so forth. Account access service 112 verifies or authenticates the credential information, allowing a user or device 102-106 to access the account if the credential information is verified or authenticated, and prohibiting the user or device 102-106 from accessing the account if the credential information is not verified or is not authenticated. Once a user's credential information is authenticated, the user can use the other services provided by online service 108. Account access service 112 can also provide various additional account management functionalities, such as permitting changes to the credential information, establishing new accounts, removing accounts, and so forth.

Photo sharing service 114 provides various functionality supporting sharing of photos among devices 102-106. Photo sharing service 114 operates in conjunction with devices 102-106 and social network service 116 to facilitate sharing photos based on proximity of devices 102-106 to one another as well as connections among devices 102-106, as discussed in more detail below.

Social network service 116 provides various functionality supporting social networks for users of devices 102-106. A user's social network refers to other users or entities that the user is acquainted or associated with, and such other users or entities are referred to as being in the user's social network. These other users or entities can be friends of the user, co-workers of the user, other entities identified by the user, and so forth. Social network service 116 allows a user to control who is in his or her social network, allowing the user to add other users to his or her social network and allowing the user to remove users from his or her social network. Social network service 116 facilitates, in conjunction with photo sharing service 114, sharing of photos among the appropriate ones of devices 102-106, as discussed in more detail below. Social network service 116 can also provide various additional social networking functionality, such as posting of messages or comments on a user's wall, communicating via email or other messaging systems, and so forth.

A social network for a user of a device 102-106 can also be established based on data on or acquired by the device 102-106 itself rather than based on a social network service 116. This data can include, for example, other users or entities on a user's contact list or in a user's address book on the device, the length and frequency of phone calls made to different users or entities, analysis of the content of text and/or email messages to identify close friends and/or family, and so forth. A user's social network can be based on social network service 116, data on or acquired by the user's device itself, or combinations thereof. Thus, in some situations system 100 does not include social network service 116.

Each of services 112, 114, and 116 can be implemented using one or more devices. Typically these devices are server computers, but any of a variety of different types of devices can alternatively be used (e.g., any of the types of devices discussed above with reference to devices 102-106). Each of services 112, 114, and 116 can be implemented using multiple ones of the same and/or different types of devices.

Additionally, although services 112, 114, and 116 are illustrated as separate services, alternatively one or more of these services can be implemented as a single service. For example, photo sharing service 114 and social network service 116 can be implemented as a single service. Furthermore, the functionality of one or more of services 112, 114, and 116 can be separated into multiple services. In addition, the functionality of online service 108 can be separated into multiple services. For example, online service 108 may include account access service 112 and photo sharing service 114, and a different service can include social network service 116.

Furthermore, although online service 108 is illustrated as separate from devices 102-106, alternatively various functionality of online service 108 can be implemented in devices 102-106. For example at least some functionality of account access service 112, photo sharing service 114, and/or social network service 116 can be implemented in devices 102-106.

Devices 102, 104, and 106 each include a photo sharing module 122, 124, and 126, respectively. Photo sharing modules 122-126, operating in conjunction with online service 108, facilitate sharing photos among devices 102-106 based on proximity of devices 102-106 to one another as well as connections among devices 102-106, as discussed in more detail below.

Each device 102-106 receives user inputs from a user of the device. User inputs can be provided in a variety of different manners, such as by pressing one or more buttons of the device, pressing one or more keys of a keypad or keyboard of the device, pressing one or more keys of a controller (e.g., remote control device, mouse, track pad or touchpad, etc.) of the device, pressing a particular portion of a touchpad or touchscreen of the device, moving a finger or other object within a particular distance of a pad or screen of the device, making a particular gesture on a touchpad or touchscreen of the device, and/or making a particular gesture on a controller (e.g., remote control device, mouse, track pad or touchpad, etc.) of the device. User inputs can also be provided via other physical feedback input to the device, such as tapping any portion of the device, an action that can be recognized by a motion detection component of the device (such as shaking the device, rotating the device, etc.), and so forth. User inputs can also be provided in other manners, such as via audible or voice inputs to a microphone, via motions of hands or other body parts observed by an image capture device, and so forth.

Figure 2:
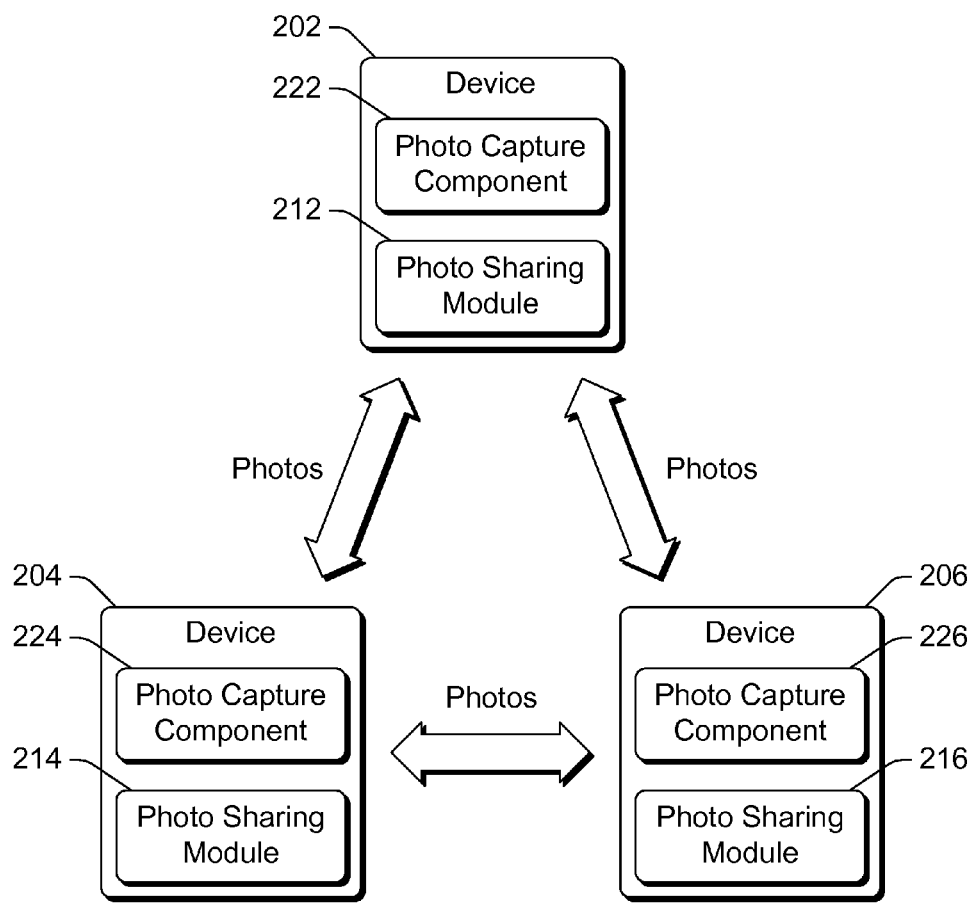
FIG. 2 illustrates another example system implementing the proximity and connection based photo sharing in accordance with one or more embodiments.

FIG. 2 illustrates another example system 200 implementing the proximity and connection based photo sharing in accordance with one or more embodiments. System 200 includes a device 202, a device 204, and a device 206, each of which can be any of a variety of different types of devices analogous to the discussion above regarding devices 102-106 of FIG. 1. Each device 202, 204 and 206 includes a photo sharing module 212, 214, and 216, respectively. Photo sharing modules 212-216, operating in conjunction with an online service (e.g., online service 108 of FIG. 1), facilitate sharing photos among devices 202-206 based on proximity of devices 202-206 to one another as well as connections among devices 202-206.

In the illustrated example, each device 202, 204, and 206 also includes a photo capture component 222, 224, and 226, respectively. Photo capture components 222, 224, and 226 are any of a variety of different conventional image capture components or devices that can capture an image. Capturing an image is also referred to as taking a picture or taking a photo. Photo capture components 222, 224, and 226 can be based on, for example, charge-coupled device (CCD) sensors and/or complementary metal-oxide-semiconductor (CMOS) sensors, although other types of sensors can alternatively be used. Although illustrated as including photo capture components 222, 224, and 226, alternatively one or more devices 202-206 may not include a photo capture component. A device without a photo capture component is not able to take photos, but can still receive and display photos shared by other devices.

In one or more embodiments, the photo sharing support provided by photo sharing modules 212-216 is based at least in part on proximity of the devices 202-206. Using the techniques discussed herein, photos are shared among devices that are in close proximity to one another, but are not shared among devices that are not in close proximity to one another. Two devices being in close proximity to one another refers to the two devices being in the same setting and/or at the same location (e.g., in the same room, in the same building, attending the same event (e.g., a sporting event, a concert, etc.), and so forth) or within a threshold distance of one another (e.g., within 50 meters of one another, within 200 meters of one another, etc.).

Whether two devices are in close proximity to one another can be determined in a variety of different manners. In one or more embodiments, each device determines other devices that are in close proximity to the device. One device can determine that another device is in close proximity in various manners. A device can determine whether another device is in close proximity based on wireless signals transmitted by the other device and/or wireless communication between the two devices using transmitters, receivers, and/or protocols. For example, wireless signals can be transmitted and/or wireless communication can occur using transmitters, receivers, and/or protocols based on Bluetooth, Bluetooth Low Energy (BLE), Near Field Communication (NFC), Infrared (IR) light, and so forth. If the transmitters, receivers, and/or protocols support no more than a threshold distance between devices, then a device can determine that another device is within the threshold distance based on whether a wireless signal is received from that other device. Alternatively, a device can determine an approximate distance to another device based on the type of wireless signal (and its known range) as well as the strength (e.g., received signal strength indicator (RSSI) values) of the wireless signal received from the other device.

A device that detects another device that is in close proximity can optionally notify a photo sharing service (e.g., photo sharing service 114 of FIG. 1) that the two devices are in close proximity to one another. The device can also optionally provide an identifier of the device as well as the other device (e.g., as provided by the other device) to the photo sharing service. The identifier of the device can be, for example, an identifier of the user of the device (e.g., an identifier used by the user to log in to an account access service, such as account access service 112 of FIG. 1). The device can also optionally notify the photo sharing service when the two devices are no longer in close proximity to one another.

In other embodiments, a photo sharing service (e.g., photo sharing service 114 of FIG. 1) determines that two devices are in close proximity to one another, and can provide to each of the devices identifiers of other devices that are in close proximity to the device. In such embodiments, when a device captures a photo the device sends the photo and/or metadata for the photo to the photo sharing service. The photo sharing service can analyze the photo itself and/or metadata for the photo to determine the location where the photo was taken. The photo sharing service also knows the identity of the device that sent the photo (e.g., due to the device having logged into an account via an account access service (e.g., account access service 112 of FIG. 1), the device sending an identifier of the device associated with the photo (e.g., as part of metadata for the photo or otherwise associated with the photo), and so forth).

The photo sharing service can analyze the photo itself and/or metadata for the photo to determine the location where the photo was taken in various manners. In one or more embodiments, the metadata for the photo includes an indication of the location. The indication of the location in the metadata for the photo can take various forms, such as global positioning system (GPS) coordinates, indications of wireless signals (e.g., Wi-Fi signals, cellular signals, etc.) and strengths (e.g., RSSI values) of those signals that are detected by the device, a location that the user of the device has checked into using a location tracking service, and so forth. This indication of the location in the metadata for the photo is used as the determined location of where the photo was taken.

Alternatively, the photo sharing service can determine the location where a photo was taken by analyzing the photo itself. Various different public and/or private object detection processes or algorithms can be used to identify known objects in photos, and the location of one or more such known objects in a photo being used as the determined location of where the photo was taken. Such objects can be particular buildings, geographic features, signs, other landmarks, and so forth.

Alternatively, the photo sharing service need not determine the specific location of where a photo was taken, but can just determine that two photos were taken at the same location and thus that two devices that took the two photos were in close proximity to one another. The photo sharing service can analyze two photos using various different public and/or private object detection processes or algorithms to identify common objects in the two pictures. If there are at least a threshold number of the same objects (e.g., one) present in each photo, then the two photos are determined to have been taken at the same location. These objects can be, for example, individuals (e.g., faces), buildings, geographic features, signs, other landmarks, and so forth.

In one or more embodiments, when determining whether a photo is shared with another device, whether two devices are in close proximity to one another refers to whether the two devices are in close proximity to one another at the time the photo is captured (or within a threshold amount of time of when the photo is captured, such as five minutes, one hour, etc.). Thus, photos are shared among devices that are in close proximity to one another when the photos are captured, or within a threshold amount of time of when the photos are captured.

Alternatively, in other embodiments whether two devices are in close proximity to one another can refer to whether the two devices are in close proximity to one another at times other than when the photo is captured. Thus, in such embodiments, photos are shared among device that are in the same setting and/or at the same location, or within a threshold distance of the same setting and/or the same location, at different times (e.g., separated by hours, days, years, etc.).

Determining whether a particular device is in close proximity to another device is based on the setting and/or location of the particular device, as discussed above. In one more embodiments, the setting and/or location of the particular device is determined only after receiving user consent to do so. This user consent can be an opt-in consent, where the user takes an affirmative action to request that the setting and/or location of the device be determined. Alternatively, this user consent can be an opt-out consent, where the user takes an affirmative action to request that the setting and/or location not be determined. If the user does not choose to opt out of this setting and/or location determination, then it is an implied consent by the user that the setting and/or location be recorded. A privacy statement can also be displayed to the user, explaining to the user how determined settings and/or locations are kept confidential. Furthermore, it should be noted that the determining of settings and/or locations of the particular device need not, and typically does not, include recording or determining any personal information identifying particular users. Thus, although settings and/or locations for a particular user may be determined, no indication of that particular user is determined or recorded.

The photo sharing support provided by photo sharing modules 212-216 is also based at least in part on the social networks of the users of the devices 202-206. Using the techniques discussed herein, photos are shared among devices that are in close proximity to one another and for which there is a connection among the devices. A connection between two devices refers to the user of at least one of the two devices being included in a social network of the user of the other device. For a particular user, the users in a social network of the particular user with which a photo is shared can be identified in different manners. For example, a photo sharing service (such as photo sharing service 114 of FIG. 1) can access a social network service (such as social network service 116 of FIG. 1) to identify the users in a social network of the particular user, or a photo sharing module 212-216 can access the social network service to identify the users in a social network of the particular user. By way of another example, a photo sharing module 212-216 can access a contact list or address book to identify users in a social network of the particular user.

It should be noted that the determination of the devices among which there is a connection can be used to determine which photos are analyzed by a photo sharing service to determine two photos were taken at the same location. Rather than analyzing the photos received from all devices to determine whether two photos were taken at the same location, for each photo the photo sharing service receives from a particular device, the photo sharing service can analyze the photo with respect to just the photos received from other devices with which there is a connection with that particular device.

A device can have one or more users, each of which can identify themselves using various credentials. In one or more embodiments, the user of a device at any particular time is the user that is logged in to an account of the online service (e.g., via account access service 112 of FIG. 1). It should be noted that the user of a device can change over time. As discussed herein, sharing a photo with a device is also referred to as sharing the photo with the user of the device.

The determination of which photos are shared with which devices can be made at the devices themselves and/or at the photo sharing service (e.g., service 114 of FIG. 1). For example, photos captured by a device can be sent to the photo sharing service, and the photo sharing services determines based on a social network of the user of the device and the proximity of the device to other devices which other devices to share those photos with. By way of another example, an indication of a social network of a user of a device can be provided by an online service (e.g., online service 108 of FIG. 1), and the device can use the indication of the social network as well as the proximity of other devices (e.g., as determined by the device or as determined by the online service and provided to the device) to determine which other devices to share photos with.

In one or more embodiments, photos taken at a device are shared automatically with other devices in close proximity to, and for which there is a connection with, the photo taking device. No additional actions need be performed by the user of the photo taking device to share photos with other devices. Alternatively, the user can be prompted to confirm that he or she desires to begin automatically sharing photos with the other devices, and the photos are automatically shared or not shared based on whether the user confirmation is received.

Alternatively, photos captured at a device are shared with user-selected ones of other devices in close proximity to, and for which there is a connection with, the photo taking device. The user-selected devices are selected by the user of the photo taking device, and can be selected when a photo is captured. For example, when a photo is captured, the user of the photo taking device can be presented with a list of users of other devices in close proximity to, and for which there is a connection with, the photo taking device. The user can provide various user inputs to select particular users from the presented list of users, and the photos are shared with the devices used by the selected particular users.

The user of the photo taking device can be presented with a list of users of other devices each time a photo is captured, or alternatively in response to a user request for the list of users. The user of the photo taking device can request that a list of users of other devices in close proximity to, and for which there is a connection with, be presented. A user selection of particular users from the list is received and recorded. Subsequently captured photos are then shared with the devices used by the selected particular users until a user input requesting that sharing stop or another user selection of particular users from the list is received.

The list of users presented to the user of the photo taking device can also be filtered in a variety of different manners to determine which users are presented in the list and/or an ordering of users in the list. The filtering can be based on frequency with which photos are shared with particular other users. For example, the list can be ordered based on frequency of photo sharing, so that the users are listed in order (e.g., top to bottom) from the user that photos are most frequently shared with to the user that photos are least frequently shared with. By way of another example, the list can be filtered to include only those users with which photos are shared with at least a threshold frequency (e.g., at least a particular percentage of photos have been shared with the user, at least a particular number of photos have been shared with the user over a particular time frame, etc.).

Alternatively, the filtering can be based on various other criteria. For example, the list of users can be filtered based on whether other users share photos with the user of the photo taking device. By way of another example, the list of users can be filtered based on how close the devices of the users are to the photo taking device (e.g., the list can be ordered based on proximity, so users of devices are listed in order (e.g., top to bottom) from the user of the device that is physically closest to the photo taking device, to the user of the device that is physically furthest from the photo taking device).

Additionally, in one or more embodiments records of user-selected other users with which photos are to be shared for particular locations can be maintained. Such records can be maintained by photo sharing modules 212-216 for their respective devices 202-206, and/or by an online service (e.g., online service 108 of FIG. 1). A user of a device can provide various inputs to request that a list of users of other devices with which there is a connection be presented, and provide various inputs to select particular users from the list. The current location of the device is determined, and a record maintained of the current location of the device and the selected particular users. When the device is subsequently at that same location, the record is used to identify the selected particular users, and photos captured at that location are then shared with the devices used by those selected particular users that are in close proximity when the photos are captured.

Sharing photos between two devices generally refers to one device allowing a photo to be displayed on another device. Photos can be shared between two devices in a variety of different manners. In one or more embodiments, photos are shared by being transferred or sent from one device to another. For example, the photo can be stored as a file (or included as part of a file storing multiple photos) and sent directly to another device. Photos can be transferred directly from one device to another via any of a variety of different wireless communication protocols, or optionally transferred via a network (such as network 110 of FIG. 1). Photos can alternatively be transferred from one device to another via a photo sharing service (such as photo sharing service 114 of FIG. 1). For example, the photo can be stored as a file (or included as part of a file storing multiple photos) and sent to the photo sharing service, which in turn sends the file to another device.

Photos can be sent using email addresses, or alternatively other identifiers of devices and/or users (e.g., as maintained by an online service such as online service 108 of FIG. 1, as maintained in contact lists or address books of devices 202-206, and so forth). For example, photos can be sent by the photo taking device to an email address of a user, another account name or identifier of the user for a service supporting messaging, and so forth. By way of another example, photos can be sent by the photo taking device to an email address managed by a photo sharing service (such as photo sharing service 114 of FIG. 1), and the photo sharing service can send the photos to an email address of a user, another account name or identifier of the user for a service supporting messaging, and so forth. Photos can also be sent via a specialized or dedicated photo channel, such as a channel on a television, on any of a variety of different types of devices, and so forth.

Email addresses can optionally be filtered based on situational awareness of the device. The device can be in different situations (e.g., at work, at a party, at a sporting event, and so forth). The situation that a device is in at any particular time can be identified in different manners, such as being input or otherwise indicated by a user of the device, being based on a time of day (e.g., at work from 8 am to 5 pm), being based on day or date (e.g., not at work on Saturday, Sunday, or January 1), being based on location of the device (e.g., based on GPS coordinates of the device, Wi-Fi signals detected by the device, etc.), and so forth. A user can have multiple email addresses, such as a personal email address and a work email address. The situation the device is in at any given time can be identified, and if determined that the current situation is work then the work email address of the user is automatically selected as the email address to which photos are sent, and if determined that the current situation is not work then the personal email address of the user is automatically selected as the email address to which photos are sent.

Alternatively, in one or more embodiments rather than sending files that include the photos, photos are shared by being made available to other devices for temporary viewing. The photos can be made available to other devices for temporary viewing by the device that captures the photos and/or by a photo sharing service (such as photo sharing service 114 of FIG. 1). The duration for which the photos are available for viewing can vary (e.g., the photos may be displayed once after which they are no longer available for viewing, the photos may be displayed for thirty minutes, for one day, and so forth). For example, a slideshow of photos can be streamed to the other device, which displays the photos as they are received in the stream but does not store the stream or the photos. The slideshow can optionally be a repeating slideshow, repeatedly displaying multiple photos. By way of another example, the photos can be made available for viewing (but not downloading) from a particular location or site via a network such as network 110 of FIG. 1 (e.g., a location or site hosted by photo sharing service 114).

Various different controls can be placed on sharing photos to restrict how the photos are shared, such as the other devices with which photos can be shared, the manner in which photos can be shared, and so forth. The controls that are associated with a particular photo can be determined in different manners, such as by a developer or distributor of a device or photo sharing service (such as photo sharing service 114 of FIG. 1), by a user or administrator of a device or the photo sharing service, and so forth. These controls can identify particular types of devices with which photos can be shared, particular security mechanisms or policies that a particular device is to have in place or adhere to in order for the photos to be shared, a lifetime of the photo (indicating a duration for which the photo can be displayed on a device), and so forth.

The controls can be associated with the photo by devices 202-206 and/or by a photo sharing service (such as photo sharing service 114 of FIG. 1). The controls can be associated with the photo when the photo is captured, such as being included as metadata for the photo by the photo capture component and/or photo sharing module of the device capturing the photo. The controls can alternatively be associated with the photo at other times, such as when the photo is shared. For example, the controls associated with a photo can be included as metadata for the photo by a photo sharing module of the device capturing the photo and/or by a photo sharing service (such as photo sharing service 114 of FIG. 1) in response to a determination being made that the photo is to be shared (based on proximity of and connection with another device, as discussed above).

The controls associated with a photo can be enforced by the photo sharing modules 212-216 and/or by a photo sharing service (such as photo sharing service 114 of FIG. 1). In one or more embodiments, the photo sharing module 212-216 on a device with which a photo is shared verifies that the controls are satisfied by that device prior to displaying the photo. If the controls are not satisfied, then the photo sharing module on that device does not present the photo (even though the device is in close proximity to and connected with the photo taking device).

Alternatively, the photo sharing module 212 on the device that captured the photo, or the photo sharing service (such as photo sharing service 114 of FIG. 1) sharing the photo verifies that the controls are satisfied by a device prior to sharing the photo with the device. Whether a device satisfies the controls can be determined by the device capturing the photo or the photo sharing service in different manners, such as by the device providing a digital certificate or other verified proof that the controls are satisfied. If the controls are not satisfied by a device, then the photo is not shared with the device (even though the device is in close proximity to and connected with the photo taking device).

The controls associated with a photo can also be referred to as the permissions of a device for that photo. The permissions of a device indicate what actions can and/or cannot be taken by the device with respect to the photo. These permissions can indicate, for example, whether the photo can be displayed on the device, a lifetime of the photo, whether the device can share the photo with other devices, and so forth.

The controls associated with a photo can be based on and indicate various securities of a device. The securities of a device refer to security mechanisms or policies that the device has in place or to which the device adheres. The controls can indicate the securities that a device is to have in order for the photo to be shared with the device. The securities of a device can identify various aspects of the device, such as the manner in which the device stores photos (e.g., encrypted or unencrypted, in a protected storage area so that other users of the device are prevented from viewing the photos, etc.), policies that the device adheres to regarding sending photos to other devices or printing photos, policies that the device adheres to regarding storage of photos on removable storage devices, particular security components or modules (and their versions) included on the device, and so forth.

The controls associated with a photo can be based on and indicate various properties (or property) of a device. The properties of a device refer to various configuration settings and/or characteristics of the device. The controls can indicate the properties that a device is to have in order for the photo to be shared with the device. The properties of a device can identify various settings and/or characteristics of the device, such as types of storage devices (e.g., removable or non-removable) included as part of the device, the size of a display screen of the device, a resolution of the display screen of the device, a type of network connection (e.g., Wi-Fi, cellular, etc.) used by the device to access an online service (such as online service 108 of FIG. 1) at a particular time, and so forth.

The permissions of a device can also identify a lifetime of the photo on the device. The lifetime of the photo indicates the duration for which the photo can be displayed on the device with which the photo is shared. The lifetime can be identified in different manners, such as an expiration date and/or time (after which the photo can no longer be displayed on the device with which the photo is shared), an amount of elapsed time (e.g., a particular number of minutes or hours after being received that the photo can be displayed on the device with which the photo is shared), a number of times the photo can be displayed on the device with which the photo is shared (e.g., one time), and so forth.

A device can have different users at different times as discussed above. In one or more embodiments, the permissions, properties, and securities of a device are based on the device itself regardless of the user of the device at any particular time. Thus, in such embodiments the permissions, properties, and securities of a device are the same for different users of the device. Alternatively, the permissions, properties, and/or securities of a device can be based on a user of the device. In such embodiments, the permissions, properties, and/or securities of a device can be different for different users of the device.

A photo can be shared with a device automatically or based on various user inputs, as discussed above. In one or more embodiments, a receiving device (the device with which photos are shared) automatically receives the shared photo, and can display or otherwise present the shared photo and/or a notification of the shared photo to the user of the receiving device. Alternatively, situations can arise in which the receiving device does not automatically receive the shared photo and/or present a notification of the shared photo. For example, a receiving device can be contextually aware of the user's actions and readily determine whether the user is currently using the device (e.g., making a phone call, playing a game, etc.). If the receiving device is currently being used by the user, then the photo is not shared with the receiving device (or alternatively the photo is shared but no notification of the photo is displayed or otherwise presented by that receiving device). By way of another example, a user input selecting a configuration setting to disable receipt of shared photos can be received, in response to which the photo is not shared with the receiving device.

Additionally, situations can arise in which the same user has multiple receiving devices in close proximity to the photo sharing device. In such situations, the photos can be shared with all of the receiving devices of the user that are in close proximity to the photo sharing device. Alternatively, one or more of the receiving devices of the user that are in close proximity to the photo sharing device can be selected to receive the photos. These one or more receiving devices can be determined in different manners. In one or more embodiments, a receiving device is contextually aware of the user's actions, and readily determines whether the user is currently using the device (e.g., making a phone call, playing a game, etc.). If a receiving device is currently being used by the user, then the photo is not shared with that receiving device (or alternatively the photo is shared but no notification of the photo is displayed or otherwise presented by that receiving device). In other embodiments, one or more default receiving devices of the user are identified, and the photos are shared with the default receiving devices of the user but not the other receiving devices of the user (or alternatively the photo is shared with the other receiving devices of the user but no notification of the photo is displayed or otherwise presented by those other receiving devices of the user). The one or more default receiving devices can be identified in different manners, such as based on a user input to a device (e.g., requesting shared photos, selecting a configuration setting identifying one or more default devices, etc.), based on an order in which devices were identified as being in close proximity to the photo sharing device (e.g., the device most recently (or initially) determined as being in close proximity to the photo sharing device is the default receiving device), based on a type of device (e.g., devices can have priorities based on the type of device, and a highest priority device is identified as the default receiving device of the user), based on random selection or other rules or criteria, and so forth.

If a photo is not to be shared with a particular receiving device, this non-sharing can be implemented in various manners. For example, the photo sharing device or photo sharing service can be notified (e.g., by the receiving device) that the receiving device is not to receive shared photos even though the receiving device is in close proximity to a photo sharing device. In response to such a notification, the photo sharing device or photo sharing service does not share photos with the receiving device. By way of another example, the receiving device can simply not access a particular location or site from which the photos are available.

In one or more embodiments, multiple users of the other devices are able to provide input regarding whether a photo including that user is shared. The users of the other devices that are in close proximity to, and for which there is a connection with, a photo taking device can provide various user inputs to reject a photo and prevent a photo including themselves from being shared. The user inputs can be provided prior to the image being captured, such as by a user input indicating "No photos of me at this location are to be shared". In response to such an input, an indication of the input is provided to the photo sharing service (e.g., photo sharing service 114 of FIG. 1) and/or the other devices that are in close proximity to, and for which there is a connection with, the device of the user to reject photos including that user. In response, the photo sharing service and/or other devices do not share photos including that user.

The user inputs can alternatively be provided in response to a shared photo, such as by a user viewing a shared photo and providing a user input indicating "Do not share this photo". Prior to sharing of the photo being finalized, the photo taking device can optionally share the photo with other devices (e.g., that are in close proximity to and for which there is a connection with the photo taking device and) that are used by a user that is identified as being included in the photo. The user can be identified as being in the photo using various different public and/or private face recognition processes or algorithms. In response to such an input indicating the photo is not to be shared, an indication of the input is provided to the photo sharing service (e.g., photo sharing service 114 of FIG. 1) and/or the device that captured the photo to not share that particular photo. In response, the photo sharing service and/or photo capture device finalizes sharing of the photo by not sharing the photo including that user. If no such indication is received, sharing of the photo is finalized by sharing the photo with all devices that are in close proximity to, and for which there is a connection with, the photo taking device.

It should be noted that not sharing a photo including a user can be performed in various different manners. In one or more embodiments, no portion of the photo is shared with other devices—the photo is not included in a file sent to other devices, the file is not stored by a photo sharing service (e.g., photo sharing service 112 of FIG. 1), the photo is not streamed to other devices, and so forth. Alternatively, the photo is altered to remove the user, and the altered photo is shared with other devices. The photo can be altered using any of a variety of public and/or private image editing processes or algorithms to delete the user from the photo (e.g., replacing the user with background data obtained from one or more other photos, moving users in the photo to squeeze them together to avoid an empty spot where the removed user was, etc.). Thus, the photo is still shared with other devices, but is shared without the user.

Thus, a user is able to reject or veto particular photos from being shared. The user can reject or veto particular photos that include the user, even though those photos are taken by other users' devices.

Using the techniques discussed herein, photo sharing can be implemented in a variety of different manners. In one or more embodiments, captured photos are analyzed to identify one or more users in the photos, and devices that are in close proximity to the photo taking device are determined. The captured photos are then shared with another device only if the other device is in close proximity to the photo taking device, there is a connection between the other device and the photo taking device, and a user of the other device is included in the photo.

In one or more embodiments, the social network of a user is analyzed and categorized into groups based on various criteria input by the user. The criteria can identify, for example, all family members, close family members, close friends, all friends, co-workers, and so forth. A particular user input, such as a voice command "share with Mom" or "send to close friends" is associated with each of the groups, and this association is maintained. The association can be maintained by the devices (e.g., photo sharing modules 212-216), or a service (e.g., photo sharing service 112 of FIG. 1). Subsequently, in response to a photo being captured and a particular user input, the captured photo is automatically shared with the users included in the associated group (optionally only if the devices being used by the user are in close proximity to the photo taking device).

Various additional filters can also be associated with each of the groups, the filters identifying whether a captured photo is automatically shared with an associated group. The filters can identify one or more users, various situations that a device may be in at any particular time, and so forth. For example, a filter can indicate to automatically share photos including a particular user (e.g., as identified using various different public and/or private face recognition processes or algorithms) with a particular group (e.g., the user's mother). By way of another example, a filter can indicate that photos taken in any situation other than work are to be automatically shared with all groups except one or more particular groups (e.g., the user's co-workers).

In one or more embodiments, captured photos are analyzed to identify one or more users in the photos, and for each of the one or more users an email address of the user is obtained (e.g., from a social network service, such as social network service 116 of FIG. 1). For each captured photo, the captured photo is sent to the email address of each user identified in the photo (optionally only if the devices being used by the user are in close proximity to the photo taking device).

In one or more embodiments, photos are made available to other devices by a photo stream or site accessible to those other devices. A token is established, such as by the photo taking device or a photo sharing service (e.g., photo sharing service 112 of FIG. 1), and provided to the other device with which the photos are shared. The token can be provided to other devices in various manners, such as by sending the token to an email address of a user of the other device, transmitting the token to the other device based on an identifier of the other device, displaying the token for capture by a photo capture component of the other device, and so forth. The token permits a device to access a photo stream, and the token is provided to each device with which photos are to be shared. The token includes, for example, a Uniform Resource Locator (URL) of a site or location where the photos are stored, identifiers of controls associated with the photos to be shared, and optionally other data as appropriate (e.g., a password or other credentials) to allow access to the photos at the site or location for a particular amount of time. The photo taking device stores photos at the photo stream or site, and the other devices can use the token to obtain the photos from the photo stream or site without further input by the photo taking device (or a user of the photo taking device).

The tokens can be distributed in various manners. In one or more embodiments, tokens are transmitted from a photo taking device or photo sharing service to another device, allowing that other device to access the photo stream. Alternatively, the tokens can be transmitted in other manners, such as being printed on or otherwise attached to physical media. The tokens can themselves be printed or affixed to the physical media, or the tokens can be encoded (e.g., using a high capacity color barcode (HCCB), a quick response (QR) code, a barcode, and so forth) and the encoded token printed on or otherwise attached to the physical media. The user of a device can then provide the token or otherwise make the token available to his or her device. For example, the user can enter the characters of the token on his or her device, have his or her device capture and decode an encoded token, and so forth. The tokens can be printed or attached to various physical media, such as a user's business card, promotional materials, postcards, brochures, and so forth.

In one or more embodiments, photos to be shared are sent from the photo taking device to another location for storage. This other location can be a site or location identified by the photo taking device, a site or location identified by a photo sharing service (e.g., photo sharing service 112 of FIG. 1) to which the photo taking device sends the photo, and so forth. The photo taking device can optionally receive, in response to sending the photo to another device or service, an indication of a location or site where the photo is stored, allowing the photo taking device to subsequently access the photo at that location or site. The photo taking device also assigns identifiers to the photos, allowing the photos to be distinguished from one another. The photo taking device can subsequently use the identifier to reference the photo at the location or site where the photo is stored, such as to delete the photo, alter the content of the photo (e.g., to remove someone from the photo), update data associated with the photo (e.g., controls or other metadata for the photo), and so forth.

In one or more embodiments, photos captured at a device in close proximity to, and for which there is a connection with, the photo taking device are treated as being given implicit permission to view the photos. However, the permission is temporary (having a particular lifetime, as discussed above), optionally unless the user of the photo taking device and the device with which the photos are shared agree to other terms. For example, after taking a photo at a meeting or in a public place, other devices in close proximity to, and for which there is a connection with, the photo taking device have permission to view the photograph for a limited time period. After the limited time period elapses, the photo fades out, blurs, is deleted, etc. from the device with which the photo was shared unless the user of the photo taking device explicitly or implicitly grants permission for others, or specific users, to keep the photo for longer (e.g., permanently or some other duration). Furthermore the digital rights granted by such sharing may have associated controls which restrict or otherwise limit what the recipient may do with the photo during the time-period in which they may view it, including restricting the ability to share the photo further with others, to take screen clippings of the photo, to save the photo to secondary storage or a service via the Internet, view the photo, and so forth. If the controls restrict the ability view the photo, a blurred or degraded version of the photo can optionally remain at the device with which the photo was shared as a token that allows that device to contact the photographer (the user of the photo taking device) and re-negotiate access to the photo, optionally including payment for such access, as desired.

Photos captured at a device can also be made available to other devices that are in the same setting and/or at the same location, or within a threshold distance of the same setting and/or the same location, at the same and/or different times. Different characteristics of the photos can be identified and optionally stored as associated with the photos. These characteristics of the photo identify the subject matter of the photo and/or other aspects of the photo, such as identifying objects in the photo, identifying locations and/or settings of the photo, identifying individuals in the photo, and so forth. These characteristics can be identified in various manners, such as by the user of the device that captured the photo, based on analysis of the photo using various public and/or proprietary algorithms or techniques (e.g., to identify individuals, landmarks, sunsets, etc.), based on the location (e.g., the location the photo was captured is within a threshold distance of a known location of a particular landmark), and so forth.

These different characteristics allow users to search for photos taken in the same setting and/or at the same location. For example, a user can search for photos having a characteristic of "sunset", and photos in the same setting and/or at the same location, or within a threshold distance of the same setting and/or the same location, at the same and/or different times having the characteristic of "sunset" can be identified and shared with the user's device. These photos can be shared with the user's device while the user's device is in the same setting and/or at the same location, or within a threshold distance of the same setting and/or the same location, or alternatively at a later time after the user's device has been in the same setting and/or at the same location, or within a threshold distance of the same setting and/or the same location. For example, a record that the user's device was at a particular location and/or in a particular setting can be maintained, and the photos captured in the same setting and/or at the same location, or within a threshold distance of the same setting and/or the same location, can be shared with the user's device at a later time.

Different settings and/or locations can also be associated with different labels. These different labels can be assigned in various manners, such as by an administrator, user, other device/service, etc. that associates labels with settings and/or locations. These labels allow a public share to be maintained associated with particular settings and/or locations, and photo taking devices treated as being given implicit permission to view the photos in that public share. For example, a public share of "Yosemite" can be established, corresponding to locations that are within a threshold distance of Yosemite National Park. While a user is within a threshold distance of Yosemite National Park (and optionally after no longer being within that threshold distance), the photos captured by other devices within the threshold distance of Yosemite National Park can be shared with the user's device. The user can also optionally search on particular characteristics, such as "sunset" or "waterfall" to view photos captured by other device within a threshold distance of Yosemite National Park and that are associated with those particular characteristics.

In one or more embodiments, photos captured at a device in close proximity to, and for which there is a connection with, the photo taking device are combined with other elements of sensed context, such as device orientation, device motion, footfalls detected through an accelerometer of the device, shifts in location of the device, and so forth. These different elements of sensed context can be identified as user inputs regarding various aspects of sharing photos. The user inputs can include various gestures to send and/or receive captured photos, and multiple gestures can be available to provide different indications of what aspect of a photo to share and/or how to share the photo. For example, in a slideshow mode, a user of the photo taking device can temporarily "project" photos to other nearby devices (e.g., as a stream of photos) to enable other users in close proximity to view the photos but not take any other action with the photos, and the photos are no longer available on the receiving devices as soon as the presenter advances to the next slide/photo. By way of another example, the user of the photo taking device can employ a different gesture, a variation on the gesture, invoke a different command from a menu prior to or after completing the sharing gesture, and so forth to "give" a photo to another user (allowing the other user to keep the photo permanently), "loan" a photo to another user (allowing the other user to keep the photo for some duration of time), share only a portion of a photo, and so on.

Any of various different user inputs or gestures can be used to indicate any of a variety of different photos to share and/or how to share the photos. For example, two devices can be bumped together to indicate that photos are to be shared. By way of another example, a touch or pen gesture that starts on the screen of a device A and ends on the screen of a device B can indicate that photos are to be shared from device A to device B. By way of another example, a user of a particular device can slide a finger to the top of the screen of the particular device and hold his or her finger there, and other users of other devices nearby can touch the tops of the screens of their devices and slide their fingers down the screen to receive the photos shared by the particular device. By way of yet another example, a user of a particular device can "hold" (e.g., touch or otherwise select) one or more photos to share and point the particular device towards another device to transmit the photos to the other device (e.g., via an IR communication channel, via a Bluetooth communication channel, or via another wireless communication channel). The other device can be identified in different manners, such as using techniques associated with the particular communication channel, the locations of the devices, inputs provided by the users of the devices, and so forth.

In the discussions herein, reference is made to a device sharing photos, and that the sharing of photos can be automatic or in response to a request from a user of the photo taking device. It should be noted that the sharing of photos can also be initiated by the device with which the photos are shared. For example, a device can detect (e.g., automatically or in response to a user input) that the photo taking device is in close proximity and send a request (e.g., via a photo sharing service such as photo sharing service 112 of FIG. 1) to the photo taking device for the photo taking device to share photos. The photo taking device can, in response to the request, automatically share photos with the requesting device or share photos in response to a user input (e.g., confirmation that sharing is permitted).

It should also be noted that, although reference is made to the sharing of photos herein, photos are examples and that various other types of content can alternatively be shared analogously. For example, captured video can be shared using the techniques discussed herein, captured audio can be shared using the techniques discussed herein, and so forth.

In the discussions herein, reference is also made to the photo taking device sharing photos. It should be noted that the photo taking device is one device that can share photos, and that other devices can optionally share photos (optionally subject to the controls associated with the photos, as discussed above). The various techniques discussed herein as being performed by the capture device can alternatively be performed by another device with which the photos were shared by the capture device or which otherwise obtained the photos.

Figure 3:
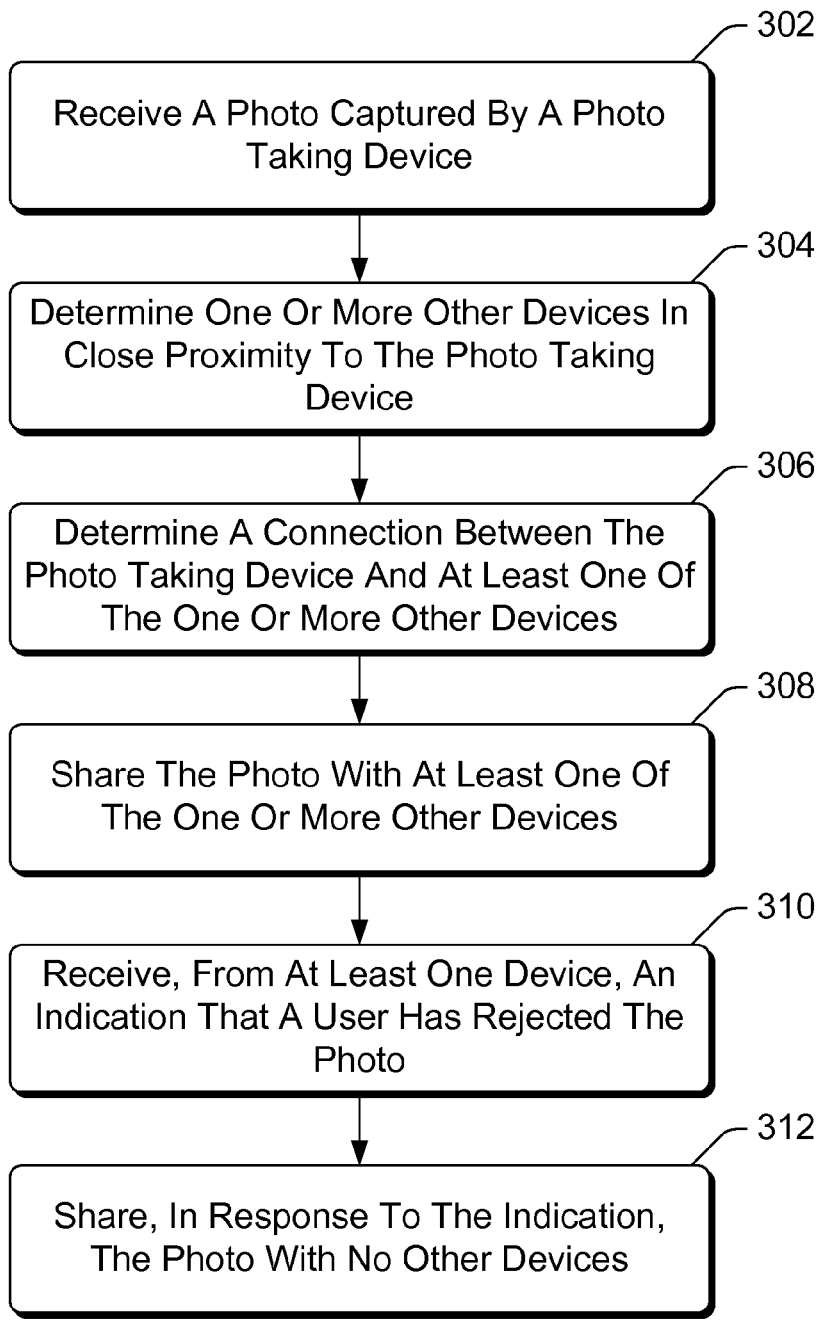
FIG. 3 is a flowchart illustrating an example process for implementing proximity and connection based photo sharing in accordance with one or more embodiments.

FIG. 3 is a flowchart illustrating an example process 300 for implementing proximity and connection based photo sharing in accordance with one or more embodiments. Process 300 is carried out by a device, such as a device 102-106 of FIG. 1 or a device 202-206 of FIG. 2, or a service such as photo sharing service 114 of FIG. 1, and can be implemented in software, firmware, hardware, or combinations thereof. Process 300 is shown as a set of acts and is not limited to the order shown for performing the operations of the various acts. Process 300 is an example process for implementing proximity and connection based photo sharing; additional discussions of implementing proximity and connection based photo sharing are included herein with reference to different figures.

In process 300, a photo captured at a device is received (act 302). The photo can be captured at a photo taking device implementing process 300, or alternatively can be received from the photo taking device.

One or more other devices in close proximity to the photo taking device are determined (act 304). These one or more devices can be determined in various manners, such as based on image analysis, GPS coordinates, indications of wireless signals detected at the devices, and so forth as discussed above.

A connection between the photo taking device and at least one of the one or more other devices is determined (act 306). A connection between two devices refers to the user of at least one of the two devices being included in a social network of the user of the other device as discussed above.

The photo is shared with at least one of the one or more other devices (act 308). This sharing can be performed in various manners, and various restrictions can be placed on the sharing as discussed above.

An indication that a user has rejected the photo can be received from at least one device (act 310). The indication is typically received from a user included in the photo, as discussed above.

In response to the indication that a user has rejected the photo, the photo is shared with no other of the one or more other devices (act 312). Sharing the photo with no other of the one or more devices, or not sharing the photo, can be accomplished in different manners, such as altering the photo to remove the user from the photo or sharing no portion of the photo with other devices, as discussed above.

Figure 4:
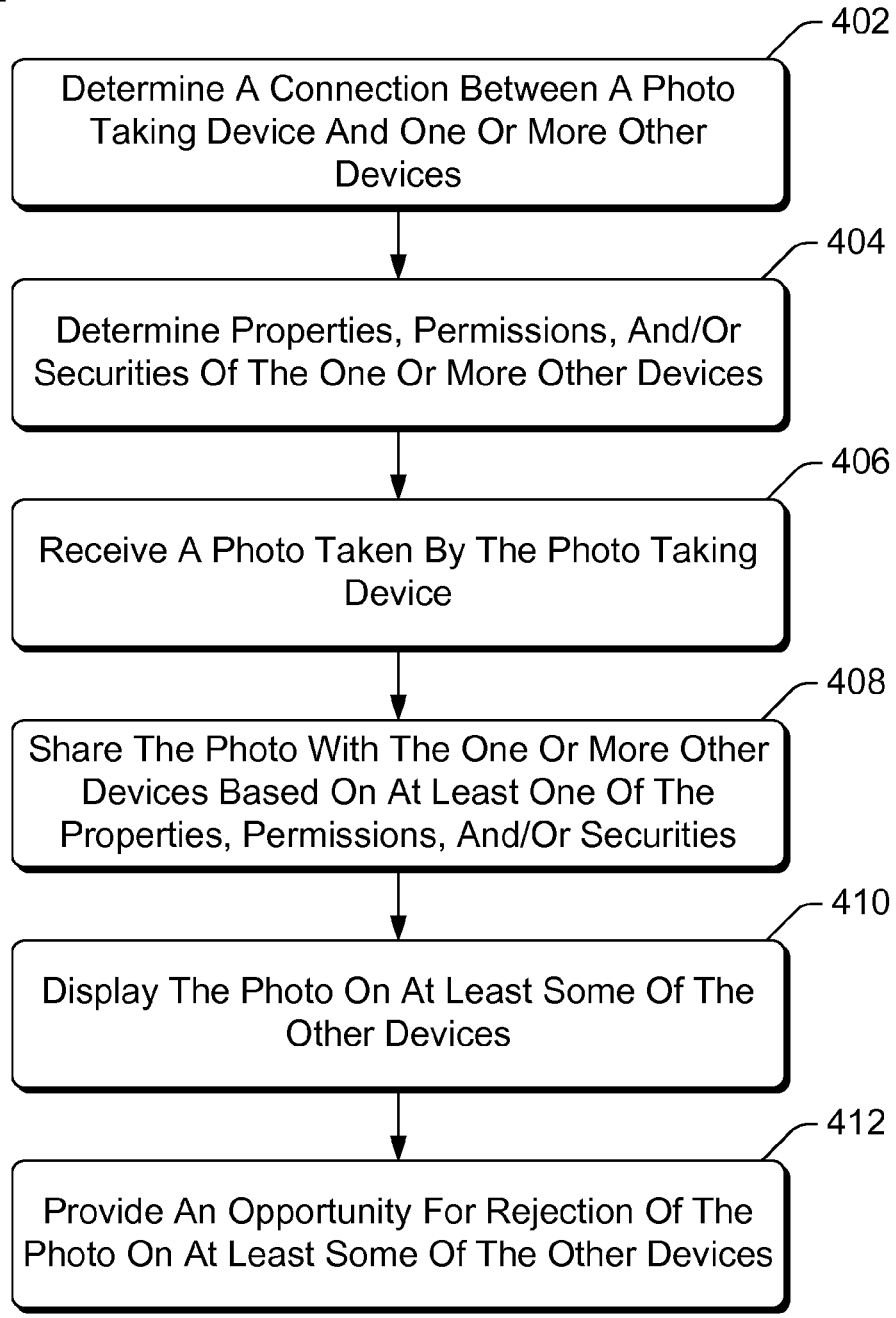
FIG. 4 is a flowchart illustrating another example process for implementing proximity and connection based photo sharing in accordance with one or more embodiments.

FIG. 4 is a flowchart illustrating an example process 400 for implementing proximity and connection based photo sharing in accordance with one or more embodiments. Process 400 is carried out in a system, such as system 100 of FIG. 1, and can be implemented in software, firmware, hardware, or combinations thereof. Process 400 is shown as a set of acts and is not limited to the order shown for performing the operations of the various acts. Process 400 is an example process for implementing proximity and connection based photo sharing; additional discussions of implementing proximity and connection based photo sharing are included herein with reference to different figures.

In process 400, a connection between a photo taking device and one or more other devices is determined (act 402). A connection between two devices refers to the user of at least one of the two devices being included in a social network of the user of the other device as discussed above.

Properties, permissions, and/or securities of the one or more devices are determined (act 404). The permissions of a device indicate what actions can and/or cannot be taken by the device with respect to the photo, as discussed above. The securities of a device refer to security mechanisms or policies that the device has in place or adheres to, as discussed above. The properties of a device refer to various configuration settings and/or characteristics of the device, as discussed above.

A photo taken by the photo taking device is received (act 406). The photo can be taken by a photo capturing component of the photo taking device in various manners, as discussed above.

The photo is shared with one or more other devices based on at least one of the properties, permissions, and/or securities (act 408). Controls associated with the photo indicate the properties, permissions, and/or securities a device is to have in order for the photo to be shared with the device, as discussed above.

The photo is displayed on at least some of the other devices (act 410). The devices on which the photo is displayed can be those devices being used by users that are included in the picture, as discussed above.

An opportunity for rejection of the photo on at least some of the devices is provided (act 412). The devices at which the opportunity is provided are those devices on which the photo is displayed in act 410, and the opportunity is provided prior to finalizing sharing of the photo as discussed above. A user can provide various inputs to indicate that the photo is rejected, as discussed above.

The techniques discussed herein provide various different usage scenarios. For example, a user can attend an event (such as a concert, a wedding, a sporting event, etc.), and easily share the photos he or she takes at that event with his or her friends that also attended the event. His or her friends can also easily share the photos they take at that event with the user, allowing the user to obtain a larger collection of photos from the event than he or she would have if relying on only the photos that he or she took.

Various actions such as communicating, receiving, sending, recording, storing, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
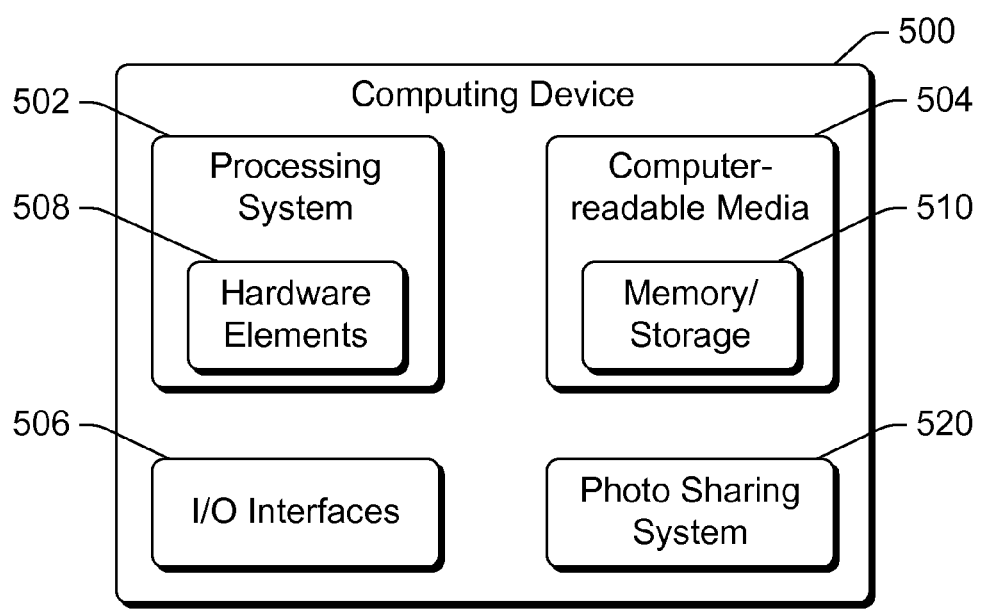
FIG. 5 illustrates an example computing device that can be configured to implement proximity and connection based photo sharing in accordance with one or more embodiments.

FIG. 5 illustrates an example computing device 500 that can be configured to implement proximity and connection based photo sharing in accordance with one or more embodiments. Computing device 500 can, for example, be a device 102-106 of FIG. 1, implement at least part of online service 108 of FIG. 1, or be a device 202-206 of FIG. 2, and so forth.

Computing device 500 as illustrated includes a processing system 502, one or more computer-readable media 504, and one or more I/O Interfaces 506 that are communicatively coupled to one another. Although not shown, computing device 500 can further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 502 is representative of functionality to perform one or more operations using hardware. Accordingly, processing system 502 is illustrated as including hardware elements 508 that can be configured as processors, functional blocks, and so forth. This can include implementation in hardware as an application specific integrated circuit or other logic device formed using one or more semiconductors. Hardware elements 508 are not limited by the materials from which they are formed or the processing mechanisms employed therein. For example, processors can be comprised of semiconductor(s) and/or transistors (e.g., electronic integrated circuits (ICs)). In such a context, processor-executable instructions can be electronically-executable instructions.

Computer-readable media 504 is illustrated as including memory/storage 510. Memory/storage 510 represents memory/storage capacity associated with one or more computer-readable media. Memory/storage 510 can include volatile media (such as random access memory (RAM)) and/or nonvolatile media (such as read only memory (ROM), Flash memory, optical disks, magnetic disks, and so forth). Memory/storage 510 can include fixed media (e.g., RAM, ROM, a fixed hard drive, and so on) as well as removable media (e.g., Flash memory, a removable hard drive, an optical disc, and so forth). Computer-readable media 504 can be configured in a variety of other ways as further described below.

Input/output interface(s) 506 are representative of functionality to allow a user to enter commands and information to computing device 500, and also allow information to be presented to the user and/or other components or devices using various input/output devices. Examples of input devices include a keyboard, a cursor control device (e.g., a mouse), a microphone (e.g., for voice or other audible inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, a tactile-response device, and so forth. Thus, computing device 500 can be configured in a variety of ways to support user interaction.

Computing device 500 also includes a photo sharing system 520. Photo sharing system 520 provides various photo sharing functionality as discussed above. Photo sharing system 520 can, for example, be a photo sharing module 122-126 of FIG. 1, be a photo sharing module 212-216 of FIG. 2, or implement at least part of photo sharing service 114 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques can be implemented on a variety of commercial computing platforms having a variety of processors.

An implementation of the described modules and techniques can be stored on or transmitted across some form of computer-readable media. The computer-readable media can include a variety of media that can be accessed by the computing device 500. By way of example, and not limitation, computer-readable media can include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 500, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 508 and computer-readable media 504 are representative of instructions, modules, programmable device logic and/or fixed device logic implemented in a hardware form that can be employed in some embodiments to implement at least some aspects of the techniques described herein. Hardware elements 508 can include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing can also be employed to implement various techniques and modules described herein. Accordingly, software, hardware, or program modules and other program modules can be implemented as one or more instructions and/or logic embodied on some form of computer-readable storage media and/or by one or more hardware elements 508. Computing device 500 can be configured to implement particular instructions and/or functions corresponding to the software and/or hardware modules. Accordingly, implementation of a module that is executable by the computing device 500 as software can be achieved at least partially in hardware, e.g., through use of computer-readable storage media and/or hardware elements 508 of the processing system. The instructions and/or functions can be executable/operable by one or more articles of manufacture (for example, one or more computing devices 500 and/or processing systems 502) to implement techniques, modules, and examples described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media having stored thereon multiple instructions that, when executed by one or more processors of a first device, cause the one or more processors to:
   receive a photo captured at the first device;
   determine a second device in close proximity to the first device;
   determine a connection between the first device and the second device;
   determine that the photo includes an image of the user of the second device;
   responsive to the determination that the second device is in close proximity to the first device, the determination that there is a connection between the first device and the second device, and the determination that the photo includes an image of the user of the second device, automatically share the photo with the second device;
   receive, from the second device, an indication that the user of the second device does not want the image of the user of the second device to be shared; and
   share, in response to the indication, the image of the user of the second device with no other devices.

2. One or more computer-readable storage media as recited in claim 1, the multiple instructions further causing the one or more processors to associate one or more controls with the photo, the one or more controls restricting how the photo is shared.

3. One or more computer-readable storage media as recited in claim 2, the controls indicating properties and/or securities that the second device is to have in order for the photo to be shared with the second device.

4. One or more computer-readable storage media as recited in claim 2, the controls including an indication of a duration for which the photo can be displayed on the second device.

5. One or more computer-readable storage media as recited in claim 1, the instructions causing the one or more processors to automatically share the photo comprising instructions causing the one or more processors to send, to the second device, a file including the photo.

6. One or more computer-readable storage media as recited in claim 1, the instructions causing the one or more processors to automatically share the photo comprising instructions causing the one or more processors to provide, to the second device, a token including a uniform resource locator of a location where the photo is stored and data to allow access to the photo at the location.

7. One or more computer-readable storage media as recited in claim 1, the connection comprising, the user of the second device being included in an online service social network of a user of the first device.

8. One or more computer-readable storage media as recited in claim 1, the multiple instructions further causing the one or more processors to:
   alter, in response to the indication, the photo to remove the image of the user of the second device from the photo; and
   share the altered photo with at least a third device.

9. In a setting with multiple devices capable of showing photos, a method comprising:
   determining a connection between a photo taking device, a second device, and a third device;
   determining properties, permissions, and/or securities of the second device and the third device;
   receiving a photo taken by the photo taking device;
   sharing the photo with the second device and the third device based on at least one of the properties, permissions, and/or securities effective to enable display of the photo on the second device and the third device;
   providing an opportunity for rejection of the photo on the second device and the third device prior to finalizing sharing the photo, rejection of the photo indicating that the photo includes an image of a user of the device rejecting the photo and that the image of the user of the device rejecting the photo is not to be shared with additional devices;
   in response to rejection of the photo by the second device, not sharing the image of the user of the second device included in the photo with additional devices; and
   in response to rejection of the photo by the third device, not sharing the image of the user of the third device included in the photo with additional devices.

10. A method as recited in claim 9, the setting comprising the multiple devices being in close proximity to one another.

11. A method as recited in claim 9, the sharing comprising sharing the photo automatically with the second device and the third device.

12. A method as recited in claim 9, the sharing comprising sharing the photo with user-selected ones of the second device and the third device.

13. A method as recited in claim 9, the connection comprising, for each of the second device and the third device, a user of the device being included in a social network of a user of the photo taking device.

14. A method as recited in claim 9, further comprising altering the photo to delete from the photo a user of the second device or the third device in response to rejection of the photo.

15. A method as recited in claim 9, a property of a device comprising one or more configuration settings and/or characteristics of the device.

16. A method as recited in claim 9, a security of a device comprising security mechanisms or policies to which the device adheres.

17. A method as recited in claim 9, a permission of a device comprising an indication of what actions can and/or cannot be taken by the device with respect to the photo.

18. A method as recited in claim 9, a permission of the device comprising an indication of a duration for which the photo can be displayed on the device.

19. A method comprising:
receiving, from a photo taking device, a photo taken at the photo taking device, one or more controls being associated with the photo;
determining a second device in close proximity to the photo taking device;
determining a connection between the photo taking device and the second device, the connection comprising a user of the second device being included in a social network of a user of the photo taking device;
receiving, from the second device, prior to receiving the photo, an indication that the user of the second device does not want any image of the user of the second device to be shared;
determining that the photo includes an image of the user of the second device; and
sharing, in response to receiving the indication and determining the photo includes an image of the user of the second device, the image of the user of the second device with no devices.

20. A method as recited in claim 19, the social network comprising an online service social network.

21. A device comprising:
one or more processors;
one or more computer-readable storage media having stored thereon multiple instructions that, when executed by the one or more processors, cause the one or more processors to perform operations comprising:
receiving a photo captured at the device;
determining a second device in close proximity to the device;
determining a connection between the device and the second device;
determining that the photo includes an image of the user of the second device;
responsive to the determination that the second device is in close proximity to the first device, the determination that there is a connection between the first device and the second device, and the determination that the photo includes an image of the user of the second device, automatically sharing the photo with the second device;
receiving, from the second device, an indication that the user of the second device does not want the image of the user of the second device to be shared; and
sharing, in response to the indication, the image of the user of the second device with no other devices.

22. The device as recited in claim 21, the multiple instructions further causing the one or more processors to perform operations comprising associating one or more controls with the photo, the one or more controls restricting how the photo is shared.

23. The device as recited in claim 22, the controls indicating properties and/or securities that the second device is to have in order for the photo to be shared with the second device.

24. The device as recited in claim 22, the controls including an indication of a duration for which the photo can be displayed on the second device.

25. The device as recited in claim 21, the instructions causing the one or more processors to automatically share the photo by sending, to the second device, a file including the photo.

26. The device as recited in claim 21, the instructions causing the one or more processors to automatically share the photo by providing, to the second device, a token including a uniform resource locator of a location where the photo is stored and data to allow access to the photo at the location.

* * * * *